(12) United States Patent
Morris (10) Patent No.: US 9,721,683 B2
(45) Date of Patent: Aug. 1, 2017

(54) WIRELESS TRANSMISSION OF NUCLEAR INSTRUMENTATION SIGNALS

(71) Applicant: WESTINGHOUSE ELECTRIC COMPANY LLC, Cranberry Township, PA (US)

(72) Inventor: Richard W. Morris, East Granby, CT (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 977 days.

(21) Appl. No.: 14/057,346

(22) Filed: Oct. 18, 2013

(65) Prior Publication Data

US 2014/0140464 A1 May 22, 2014

Related U.S. Application Data

(63) Continuation-in-part of application No. 12/577,789, filed on Oct. 13, 2009, now Pat. No. 8,599,987.

(51) Int. Cl.
*G21C 17/00* (2006.01)
*G21C 17/10* (2006.01)
*G21D 7/04* (2006.01)

(52) U.S. Cl.
CPC ............. *G21C 17/00* (2013.01); *G21C 17/10* (2013.01); *G21D 7/04* (2013.01)

(58) Field of Classification Search
USPC ........................................ 376/245, 247, 258
See application file for complete search history.

(56) References Cited

U.S. PATENT DOCUMENTS

| 4,943,683 A | 7/1990 | Utsunomiya et al. |
| 5,021,210 A | 6/1991 | Utsunomiya et al. |
| 5,116,567 A | 5/1992 | Fennem |
| 5,712,886 A | 1/1998 | Baldy |
| 2002/0065065 A1 | 5/2002 | Lunsford et al. |

(Continued)

FOREIGN PATENT DOCUMENTS

| EP | 2 045 032 A1 | 4/2009 |
| JP | 03-181889 A | 8/1991 |
| JP | 2008-286664 A | 11/2008 |

OTHER PUBLICATIONS

Korean Intellectual Patent Office, "International Search Report and Written Opinion (PCT/US2014/055390)", May 29, 2015, 11 pp.

(Continued)

*Primary Examiner* — Marshall O'Connor
(74) *Attorney, Agent, or Firm* — Richard J. Coldren; Westinghouse Electric Company LLC (57) ABSTRACT

A system for monitoring a condition of a nuclear reactor pressure vessel disposed in a radioactive environment includes an instrument structured to monitor a condition of the nuclear reactor pressure vessel; a powered wireless transmitting modem disposed in the radioactive environment, the wireless transmitting modem being electrically coupled to the instrument; a receiving modem disposed in the line of sight of the transmitting modem, the receiving modem being in wireless communication with the transmitting modem; and a signal processing unit electrically coupled to the receiving modem, the signal processing unit being structured to determine the condition of the nuclear reactor pressure vessel from the instrument. The transmitting modem is powered by a thermocouple disposed in or on the reactor pressure vessel.

20 Claims, 5 Drawing Sheets

(56) References Cited

U.S. PATENT DOCUMENTS

2007/0201601 A1    8/2007   Oda et al.
2008/0123795 A1    5/2008   Hyde et al.
2008/0169922 A1    7/2008   Issokson
2013/0083879 A1    4/2013   Heibel et al.

OTHER PUBLICATIONS

European Patent Office, "Extended European Search Report for EP 10838042.9 (PCT/US2010/049730)", Dec. 5, 2015, 8 pp.
"EPRI Wireless Projects—Turbine Exhaust Fan", EPRI Newsletter, Aug. 2002, pp. 4-5.
"On-Line Monitoring; Applications of Wireless Technology and Fleet-Wide Monitoring", Joint IAEA-EPRI Workshop, Vienna Austria, Oct. 3-6, 2006.
"Into A Nuclear Power Plant with B&B Electronics 802.15.4 Wireless", internet article, B&B Electronics Manufacturing Company.
2001 Releases (from the Internet) by ROV Technologies, Inc., News Release Nos. 164, 165, 166 and 167.

United States Patent [19]

WIRELESS TRANSMISSION OF NUCLEAR INSTRUMENTATION SIGNALS

CROSS REFERENCE TO RELATED APPLICATION

This application is a Continuation-In-Part application of U.S. application Ser. No. 12/577,789, entitled WIRELESS TRANSMISSION OF NUCLEAR INSTRUMENTATION SIGNALS, filed on Oct. 13, 2009.

FIELD OF THE INVENTION

The present invention is directed to monitoring of a nuclear reactor pressure vessel. More particularly, the present invention is directed to a system and method for wirelessly monitoring a condition of a nuclear reactor pressure vessel.

BACKGROUND OF THE INVENTION

The mechanical movement (i.e. insertion, withdrawal) and the associated monitoring of the position of the control rods are necessary functions for the operation of a nuclear reactor. Each of the instruments that perform this function typically is terminated with a power cable and one or two position indication cables that transmit signals from the instrument back to processing units, typically located in a control room. As used herein, the term instrument may also include a sensor or sensing device. Known rod position indicator cable systems, such as the one depicted in FIGS. 1 and 2, typically include multi pin connector disconnect points 10 located at the top of the nuclear reactor vessel head 12 and at the reactor cavity wall 14 poolside. Additional disconnect points 10 may also be located at other points between the vessel head 12 and the cavity wall 14. The multi pin connector disconnect points 10 allow each of the interconnecting cable sections 16 to be removed from corresponding sensing instruments 18 to allow for the disassembly of the reactor vessel 8 for refueling. The typical reactor vessel 8 includes on the order of magnitude of 100 or more of these cable assemblies.

The removal and installation of the cable sections 16 is generally part of the "critical path" schedule for a refueling outage and generally requires the services of a specially trained crew of technicians during both the initial and concluding stages of the refueling outage in order to complete the work. Typically, such work can take up to an entire shift to complete. In total, the manipulation of the signal cable sections 16 may occupy an entire day of a 30 day outage. Given an estimated cost of $20,000 to $25,000 per hour of lost critical path time, this one day period would represent a cost of approximately $500,000 per refueling outage without even taking into consideration the cost of the trained work crew.

Additionally, the repeated manipulation of the signal cables increases the potential for damage, leading to the need to repair and/or replace the cables and/or the related hardware. Furthermore, the manipulation of the signal cables must be carried out in a radiation area located above the reactor vessel. Elimination of this work scope would thus eliminate the radiation exposure associated with this work activity.

Accordingly, there exists room for improvement in the system and method for monitoring the position of the control rods and other reactor conditions.

SUMMARY OF THE INVENTION

In accordance with an embodiment of the invention, a method of monitoring a condition of a nuclear reactor pressure vessel disposed in a radioactive environment is provided. The method comprises: sensing a condition of the reactor pressure vessel with an instrument, transmitting a signal indicative of the condition of the reactor pressure vessel from the instrument to a powered wireless transmitting modem disposed in the radioactive environment, wirelessly transmitting a signal indicative of the condition of the reactor pressure vessel from the transmitting modem to a receiving modem in the line of sight of the transmitting modem, transmitting a signal indicative of the condition of the reactor pressure vessel from the receiving modem to a signal processing unit, and determining the condition of the reactor pressure vessel from the wirelessly transmitted signal.

The wireless transmission may comprise an infrared transmission. The condition of the reactor pressure vessel may be sensed by a plurality of instruments operatively connected with a plurality of transmitting modems. The plurality of wireless transmitting modems may transmit signals to a plurality of receiving modems operatively connected with the signal processing unit for determining the condition of the reactor pressure vessel.

The condition of the reactor pressure vessel may be sensed by a plurality of instruments operatively connected with a transmitting modem and the transmitting modem may transmit a signal to a receiving modem operatively connected with the signal processing unit for determining the condition of the reactor pressure vessel.

The condition of the reactor pressure vessel may be determined during power generation operations. The condition of the reactor pressure vessel may be determined while the reactor pressure vessel is disassembled.

The powered transmitting modem may be bridged with a second powered transmitting modem so that the second transmitting modem will continue to function should its power source fail.

The transmitting modem may be powered by a regenerative battery. The transmitting modem may be externally powered. The transmitting modem may be powered parasitically from a power cable associated with a control rod drive mechanism.

The condition monitored may be one of: control rod position, coolant water bulk temperature, coolant water level, radiation level, and ion chamber level.

In accordance with another embodiment of the invention, a system for monitoring a condition of a nuclear reactor pressure vessel disposed in a radioactive environment is provided which comprises an instrument structured to monitor a condition of the nuclear reactor pressure vessel, a powered wireless transmitting modem disposed in the radioactive environment, a receiving modem in the line of sight of the transmitting modem, and a signal processing unit electrically coupled to the receiving modem. The wireless transmitting modem is electrically coupled to the instrument. The receiving modem is in wireless communication with the transmitting modem. The signal processing unit is structured to determine the condition of the nuclear reactor pressure vessel from the instrument.

The condition of the reactor pressure vessel may be sensed by a plurality of instruments operatively connected with a plurality of transmitting modems. The plurality of wireless transmitting modems may transmit signals to a plurality of receiving modems operatively connected with the signal processing unit for determining the condition of the reactor pressure vessel.

The condition of the reactor pressure vessel may be monitored during power generation operations. The condition of the reactor pressure vessel may be monitored while the reactor pressure vessel is disassembled.

The powered transmitting modem may be bridged with a second powered transmitting modem so that the second transmitting modem will continue to function should the powered transmitting modem fail.

The transmitting modem may be powered by a regenerative battery. The transmitting modem may be externally powered. The transmitting modem may be powered parasitically from a power cable associated with a control rod drive mechanism. The transmitting modem may be powered by a thermocouple disposed in or on the reactor pressure vessel. The transmitting modem may be directly powered by a regenerative battery which is charged by the thermocouple disposed in or on the reactor pressure vessel. The transmitting modem may be powered by one or both of a regenerative battery and the thermocouple electrically coupled to the transmitting modem in a parallel arrangement.

The condition monitored may be one of control rod position, coolant water bulk temperature, coolant water level, radiation level, and ion chamber level.

The instrument may comprise a plurality of sensing instruments, each instrument being structured to monitor a condition of the nuclear reactor pressure vessel.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention will now be described more fully hereinafter with reference to the accompanying drawings, in which examples of the invention are shown. The invention may, however, be embodied in many different forms and should not be construed as limited to the examples set forth herein. Rather, these examples are provided so that this disclosure will be thorough and complete, and will fully convey the scope of the invention to those skilled in the art. Like numbers refer to like elements throughout.

Figure 1:
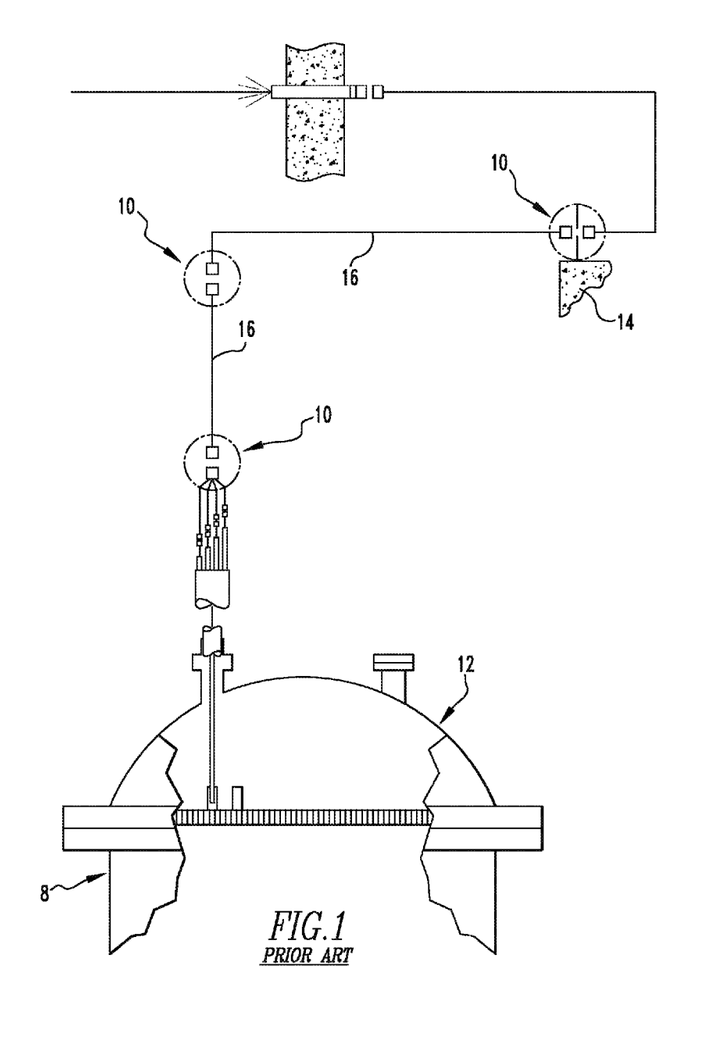
FIG. 1 shows a schematic view of a known system for monitoring the condition of a nuclear reactor pressure vessel.
Figure 2:
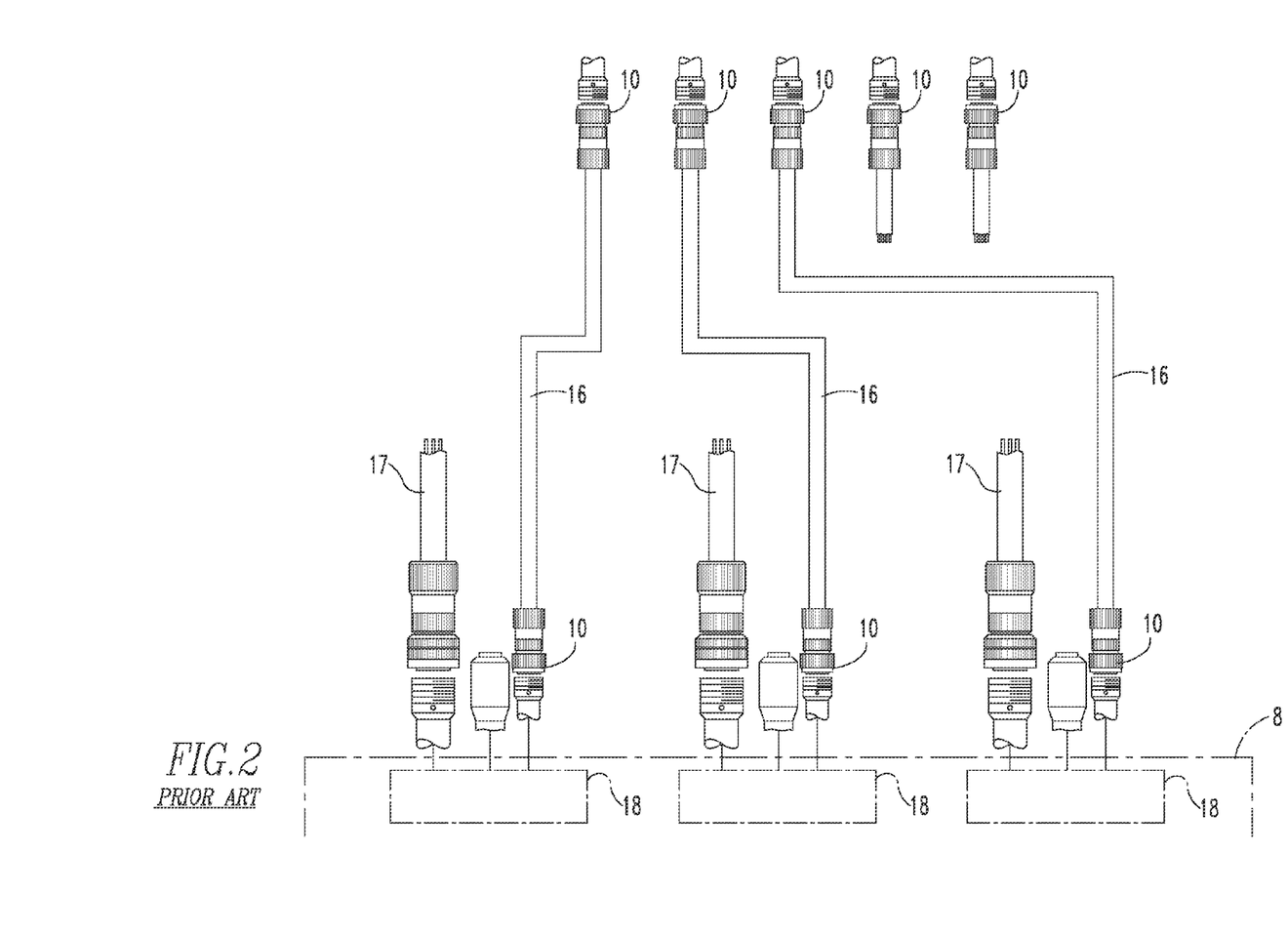
FIG. 2 shows a more detailed schematic view of a portion of the system shown in FIG. 1.
Figure 3:
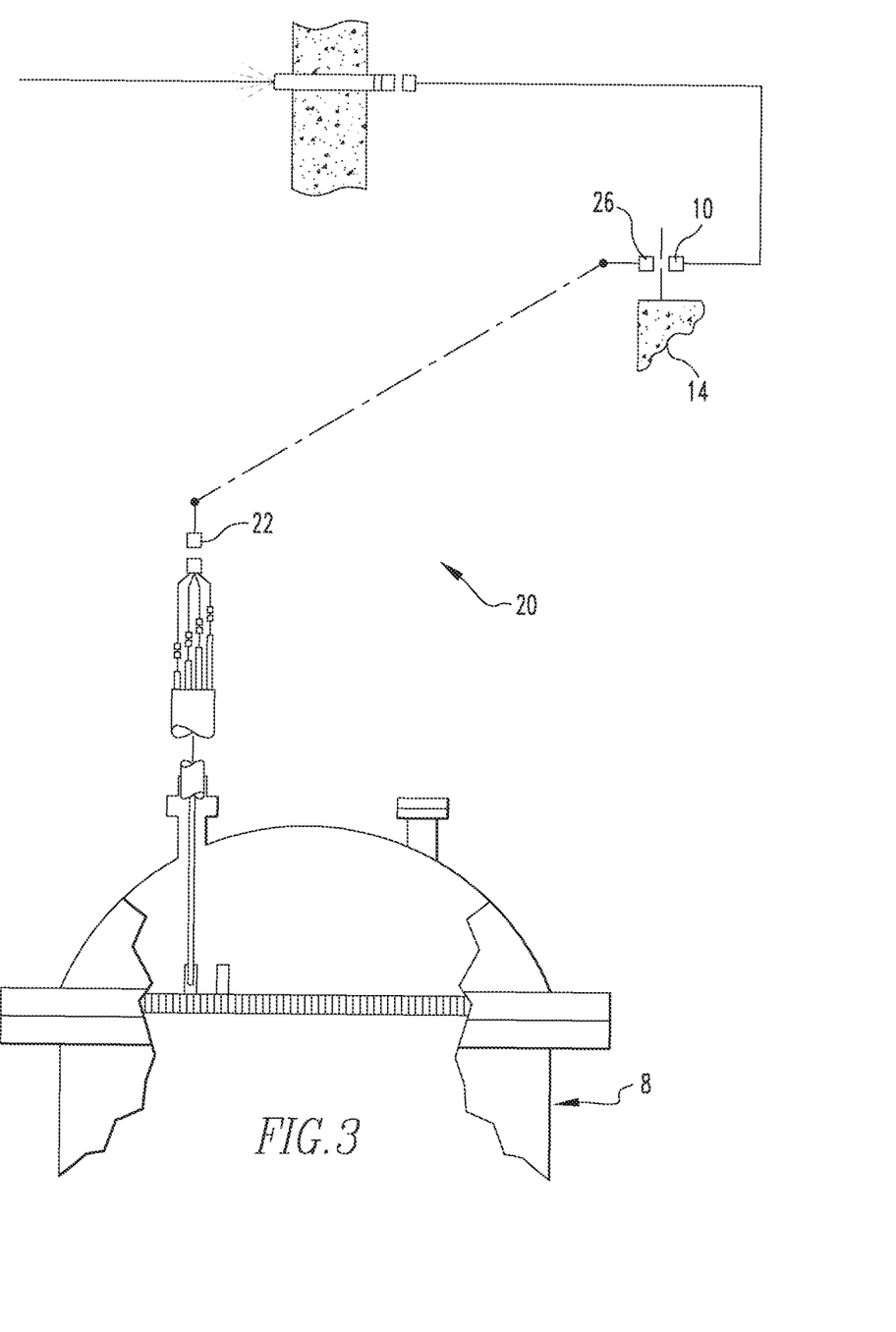
FIG. 3 shows a schematic view of an improved system for monitoring the condition of a nuclear reactor pressure vessel according to an embodiment of the present invention.
Figure 4:
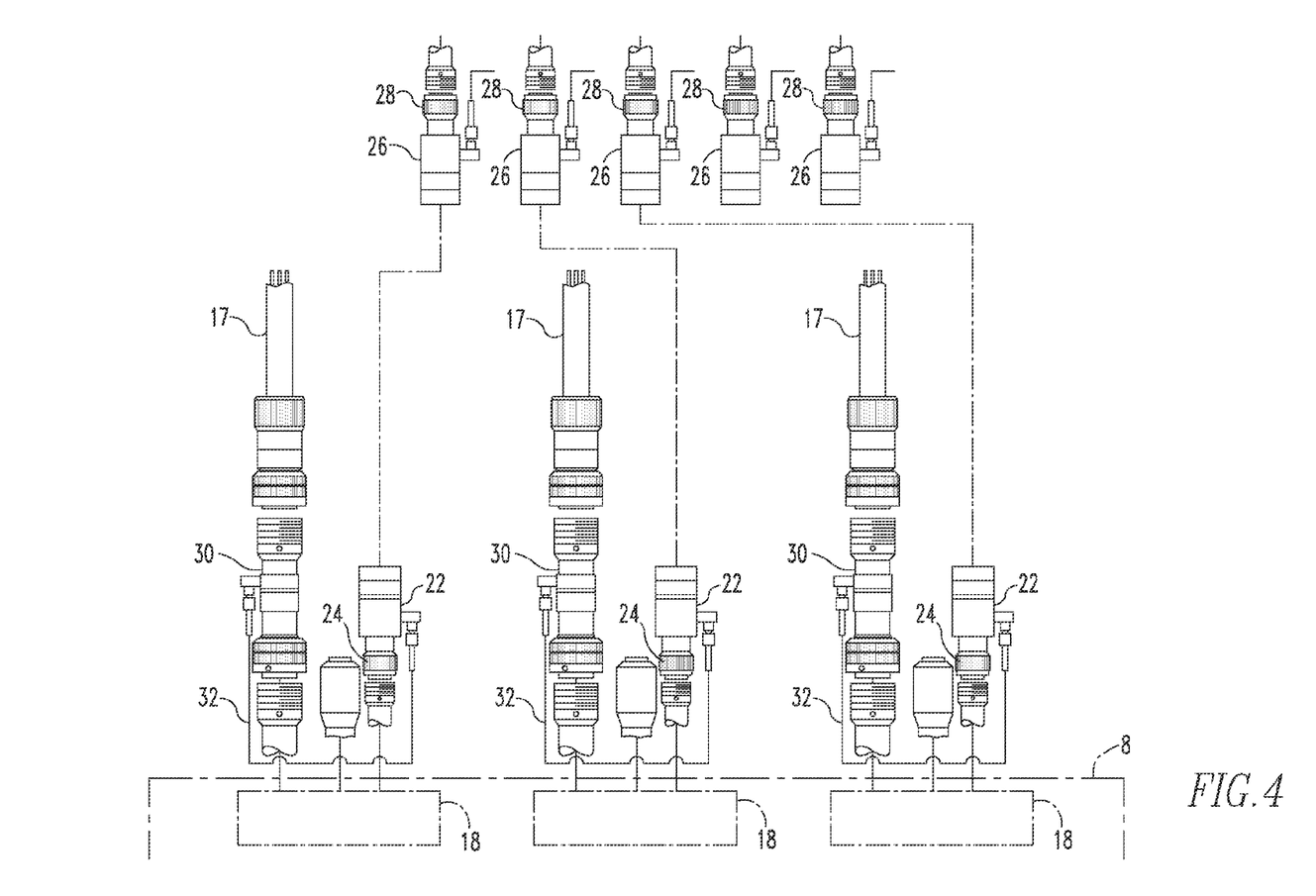
FIG. 4 shows a more detailed schematic view of a portion of the improved system shown in FIG. 3.

FIGS. 3 and 4 illustrate an example improved monitoring system 20 in accordance with the present invention that provides for the monitoring of one or more conditions of a nuclear reactor pressure vessel 8 without the need of cable sections 16 (such as those shown in FIGS. 1 and 2). As shown in FIG. 4, the multi pin connectors 10 (shown in FIGS. 1 and 2) at both ends of the former cable section 16 are replaced with wireless modems 22,26, with each modem 22,26 having a respective integral mating connector assembly 24,28. The modem 22 at the instrument 18 end (i.e. at the reactor vessel 8, FIG. 4) is a wireless transmitter electrically coupled to the instrument 18, while the modem 26 at the reactor cavity wall 14 (FIG. 3) is a wireless receiver. The term "modem", as used herein, shall be used to refer to a suitable electrical device capable of at least one of sending and receiving wireless transmission signals such as, for example, without limitation, via infrared transmission. The remainder of the rod control position and other instrument signal hardware is not changed from that shown in FIGS. 1 and 2.

Referring to FIG. 4, the transmitter modem 22 is parasitically powered from the power cable 17 for the associated rod control drive mechanisms.

This is accomplished by insertion of a double-ended multi pin connector assembly 30 in series with the existing power cable 17 at the multi pin connector on the instrument assembly 18. This double-ended multi pin connector assembly 30 also includes an appropriately sized parasitic bleed power cable 32 that is mated to, and powers, the neighboring transmitter modem 22 and instrument 18. Each modem typically only requires a fraction of a watt to power which has a generally transparent effect on the capacity of the comparably massive power cable 17. Likewise, the voltage potential required to operate the level indication probe (not numbered) could be reduced, if needed, whereas an overly amplified signal is not required or desired at the front end of the modem 22. Therefore, sufficient source power is available without significant additional modification to an existing power cable circuit.

Additionally, expected power supply interruptions from the power cables as a result of instrument operations (i.e. mechanical control rod movement and static retention mode) may be bridged and conditioned within either the modem 22 and/or the double ended connector assembly 30 in the power cable circuit. Although not a preferred embodiment, it can also be appreciated that the power for each of the modems 22 could be supplied from alternate power sources found within the reactor vessel assembly (e.g., without limitation, power sources for thermocouples, solenoid operated devices, fan motors, switches, lighting) and/or dedicated power sources (e.g., without limitation, regenerative batteries).

Figure 5:
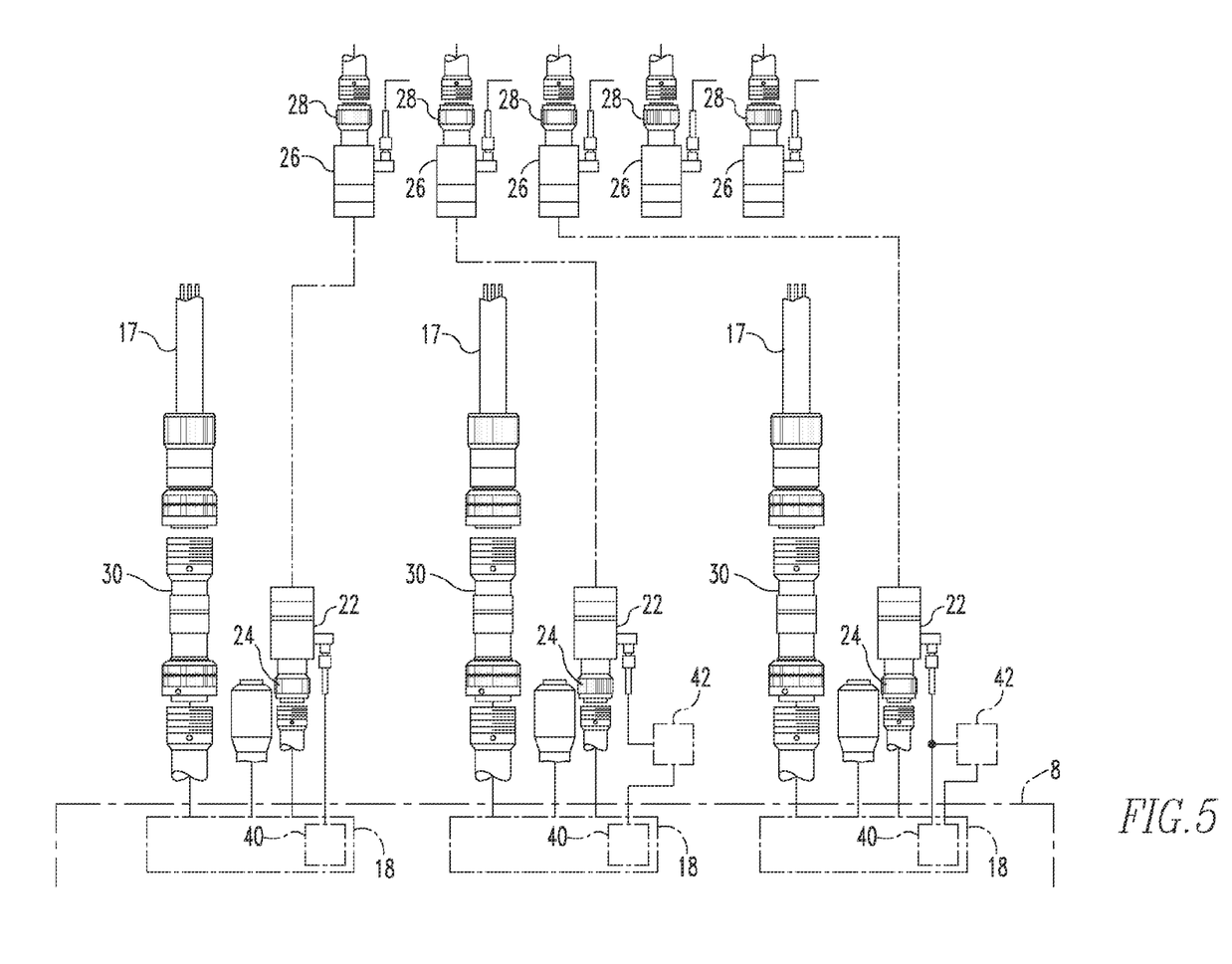
FIG. 5 shows a detailed schematic view of alternate embodiments of a portion of the improved system shown in FIG. 3.

FIG. 5 illustrates some alternative embodiments of the present invention in which the transmitter modem 22 is powered by voltage produced by a thermocouple 40 (shown schematically) disposed in or on the reactor vessel. As shown in the arrangement in the left portion of FIG. 5, the thermocouple 40 may be directly electrically connected to the transmitter modem 22. As shown in the arrangement in the middle of FIG. 5, the thermocouple 40 may be electrically connected to a regenerative battery 42 which is electrically connected to the transmitter modem 22. As shown in the arrangement in the right portion of FIG. 5, the thermocouple 40 and regenerative battery 42 may both be directly electrically connected to the transmitter modem 22 in a parallel arrangement.

Although shown generally as being electrically connected to only one thermocouple 40, it is to be appreciated that multiple thermocouples 40 and/or regenerative batteries 42 could also be employed to power one or more transmitting modems 22. Such an arrangement provides a) redundancy in the unlikely event that a thermocouple fails and b) excess power which may be utilized to power a more powerful transmitter modem and/or provide faster recharging of the regenerative battery or batteries.

In another example, one or more of the transmitting modems 22 may be bridged with a second transmitting modem (not shown) powered by a different power source. Such redundant arrangement would provide for the second transmitting modem to continue to function should the power source of the transmitting modem 22 fail.

In yet another example, one or more of the transmitting modems 22 may be electrically coupled to a plurality of instruments 18 for detecting and transmitting one or more conditions of the reactor. Such arrangement may be employed to reduce the number of modems 22 needed. Such an arrangement may also be employed to provide redundancy by electrically coupling one instrument to multiple modems 22 (and thus having each modem electrically coupled to multiple instruments 18).

Regardless of the transmitting modem arrangement employed, the receiver modem 26 is installed on the "abandoned" end (i.e. electrical connector 10) of the existing rod position indication cables located at the reactor cavity wall 14 (FIG. 3). Preferably each of the receiver modems 26 is installed within the line of sight of each of the corresponding transmitting modems 22. Such line of sight transmission generally minimizes power requirements and the possibility of interference with the transmitted signals.

Each of the receiver modems 26 may be supplied power either from the existing source voltage of the existing rod position indication cable system, parasitically from the associated power cable system, or from an alternate or dedicated power source(s). In a preferred embodiment, each existing signal cable end is assigned a discrete modem 26. That is, if there were fifty signal cables, there would be fifty transmitter modems 22 and fifty receiver modems 26. It is to be appreciated that the modems 22,26 could be combined into a lesser number of larger modems. It is also to be appreciated that the present invention may be incorporated into other in-containment cable instrumentation systems that would benefit from elimination of interconnecting cable assemblies (e.g., without limitation, reactor vessel level indication, containment area radiation monitors and ion chambers). In installations with two or more independent level indication instruments for a particular mechanism, one instrument could be outfitted according to the present invention while the second or others could remain unchanged. Such arrangement would provide additional system redundancy using independent hardware.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A system for monitoring a condition of a nuclear reactor pressure vessel disposed in a radioactive environment, the system comprising:
    an instrument structured to monitor a condition of the nuclear reactor pressure vessel;
    a powered wireless transmitting modem disposed in the radioactive environment, the wireless transmitting modem being electrically coupled to the instrument;
    a receiving modem disposed in the line of sight of the transmitting modem, the receiving modem being in wireless communication with the transmitting modem; and
    a signal processing unit electrically coupled to the receiving modem, the signal processing unit being structured to determine the condition of the nuclear reactor pressure vessel from the instrument,
    wherein the transmitting modem is powered by a thermocouple disposed in or on the reactor pressure vessel.

2. The system of claim 1, wherein the transmitting modem is directly powered by a regenerative battery which is charged by the thermocouple disposed in or on the reactor pressure vessel.

3. The system of claim 1, wherein the transmitting modem is powered by one or both of a regenerative battery and the thermocouple electrically coupled to the transmitting modem in a parallel arrangement.

4. The system of claim 1, wherein the condition of the reactor pressure vessel is sensed by a plurality of instruments operatively connected with a plurality of wireless transmitting modems and the plurality of wireless transmitting modems transmit signals to a plurality of receiving modems operatively connected with the signal processing unit for determining the condition of the reactor pressure vessel.

5. The system of claim 1, wherein the condition of the reactor pressure vessel is monitored during power generation operations.

6. The system of claim 1, wherein the condition of the reactor pressure vessel is monitored while the reactor pressure vessel is disassembled.

7. The system of claim 1, wherein the condition monitored is one of: control rod position, coolant water bulk temperature, coolant water level, radiation level, and ion chamber level.

8. The system of claim 1, wherein the instrument comprises a plurality of instrument, each instrument being structured to monitor a condition of the nuclear reactor pressure vessel.

9. A method of employing the system of claim 1, the method comprising:
    electrically coupling the wireless transmitting modem to an instrument structured to monitor a condition of the nuclear reactor pressure vessel;
    electrically coupling the wireless transmitting modem to a thermocouple disposed in or on the reactor pressure vessel;
    positioning the receiving modem in the line of sight of the transmitting modem; and
    determining the condition of the nuclear reactor pressure vessel from the instrument via a transmission made via the wireless transmitting modem and the receiving modem.

10. A method of monitoring a condition of a nuclear reactor pressure vessel disposed in a radioactive environment, comprising:
    sensing a condition of the reactor pressure vessel with an instrument;
    transmitting a signal indicative of the condition of the reactor pressure vessel from the instrument to a powered wireless transmitting modem disposed in the radioactive environment;
    wirelessly transmitting a signal indicative of the condition of the reactor pressure vessel from the transmitting modem to a receiving modem in the line of sight of the transmitting modem;

transmitting a signal indicative of the condition of the reactor pressure vessel from the receiving modem to a signal processing unit; and determining the condition of the reactor pressure vessel from the wirelessly transmitted signal.

11. The method of claim 10, wherein the wireless transmission comprises an infrared transmission.

12. The method of claim 10, wherein the condition of the reactor pressure vessel is sensed by a plurality of instruments operatively connected with a plurality of transmitting modems and wherein a plurality of wireless transmitting modems transmit signals to a plurality of receiving modems operatively connected with the signal processing unit for determining the condition of the reactor pressure vessel.

13. The method of claim 10, wherein the condition of the reactor pressure vessel is sensed by a plurality of instruments operatively connected with a transmitting modem and wherein the transmitting modem transmits a signal to a receiving modem operatively connected with the signal processing unit for determining the condition of the reactor pressure vessel.

14. The method of claim 10, wherein the condition of the reactor pressure vessel is determined during power generation operations.

15. The method of claim 10, wherein the condition of the reactor pressure vessel is determined while the reactor pressure vessel is disassembled.

16. The method of claim 10, wherein the powered transmitting modem is bridged with a second powered transmitting modem so that the second transmitting modem will continue to function should its power source fail.

17. The method of claim 10, wherein the transmitting modem is powered by a regenerative battery.

18. The method of claim 10, wherein the transmitting modern is externally powered.

19. The method of claim 10, wherein the transmitting modem is powered parasitically from a power cable associated with a control rod drive mechanism.

20. The method of claim 10, wherein the condition monitored is one of: control rod position, coolant water bulk temperature, coolant water level, radiation level, and ion chamber level.

* * * * *